(12) United States Patent
Park et al.

(10) Patent No.: US 9,088,871 B2
(45) Date of Patent: Jul. 21, 2015

(54) BEHAVIORAL PATTERN COLLECTING APPARATUS, AND BEHAVIORAL PATTERN ANALYZING SYSTEM AND METHOD USING THE SAME

(75) Inventors: Chan Kyu Park, Daejeon (KR); Jae Hong Kim, Daejeon (KR); Cheon Shu Park, Daejeon (KR); Sang Seung Kang, Daejeon (KR); Min Su Jang, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 13/586,213

(22) Filed: Aug. 15, 2012

(65) Prior Publication Data
US 2013/0178185 A1 Jul. 11, 2013

(30) Foreign Application Priority Data
Jan. 6, 2012 (KR) ........................ 10-2012-0002030

(51) Int. Cl.
| H04M 11/04 | (2006.01) |
| H04W 4/02 | (2009.01) |
| H04W 4/22 | (2009.01) |
| G08B 21/04 | (2006.01) |

(52) U.S. Cl.
CPC ........... *H04W 4/027* (2013.01); *G08B 21/0423* (2013.01); *H04W 4/22* (2013.01)

(58) Field of Classification Search
CPC ....... H04W 4/025; G01C 21/00; H01S 1/024; G01S 5/0036
USPC ................. 455/404.2, 456.1–456.6
See application file for complete search history.

(56) References Cited

U.S. PATENT DOCUMENTS

| 8,401,003 B1 * | 3/2013 | Petit-Huguenin et al. .... 370/352 |
| 2004/0100376 A1 | 5/2004 | Lye et al. |
| 2005/0208925 A1 * | 9/2005 | Panasik et al. ............. 455/404.1 |
| 2009/0088204 A1 * | 4/2009 | Culbert et al. ............. 455/556.1 |
| 2011/0224509 A1 * | 9/2011 | Fish et al. ..................... 600/301 |

* cited by examiner

*Primary Examiner* — Olumide T Ajibade Akonai
*Assistant Examiner* — Edward Zhang
(74) *Attorney, Agent, or Firm* — Nelson Mullins Riley & Scarborough LLP; Anthony A. Laurentano, Esq.; Lewis Lee, Esq.

(57) ABSTRACT

Disclosed are a wearable behavioral pattern collecting apparatus for generating collected information by analyzing a behavioral pattern of a wearer, and generating and thereby transmitting emergency call information when an emergency situation occurs, a network including a repeater to transmit information received from the behavioral pattern collecting apparatus to a remote monitoring server, and a behavioral pattern analyzing system and method for transmitting information on an emergency accident and a position of the wearer to a corresponding institution or a corresponding person in charge when an emergency situation such as a falling accident or the emergency accident occurs by observing a change in the behavioral pattern of the wearer.

16 Claims, 9 Drawing Sheets

BEHAVIORAL PATTERN COLLECTING APPARATUS, AND BEHAVIORAL PATTERN ANALYZING SYSTEM AND METHOD USING THE SAME

CROSS-REFERENCE TO RELATED APPLICATIONS

This application claims priority to and the benefit of Korean Patent Application No. 10-2012-0002030 filed in the Korean Intellectual Property Office on Jan. 6, 2012, the entire contents of which are incorporated herein by reference.

TECHNICAL FIELD

The present invention relates to a wearable behavioral pattern collecting apparatus for generating collected information by analyzing a behavioral pattern of a wearer, and generating and thereby transmitting emergency call information when an emergency situation occurs, a network including a repeater to transmit information received from the behavioral pattern collecting apparatus to a remote monitoring server, and a behavioral pattern analyzing system and method for transmitting information on an emergency accident and a position of the wearer to a corresponding institution or a corresponding person in charge when an emergency situation such as a falling accident or the emergency accident occurs by observing a change in the behavioral pattern of the wearer.

BACKGROUND ART

With development of an information technology (IT), an Internet infrastructure has been expanded even in sanitarium centers or medical institutions. An IT based healthcare technology is being further developed. However, due to the increase of an ageing society, burden of additional medical cost increases and accordingly, a relevant system has been changing from a treatment based policy to a prevention based policy.

An old person is highly likely to fall into an emergency situation and has a degraded capability for coping with an emergency situation. Accordingly, without appropriate countermeasures, a serious circumstance may arise. In particular, a falling accident may occur due to various diseases and may also simply occur due to old age. Accordingly, there is a need for prevention and a prompt action when the falling accident occurs.

In a related art, using a miniaturized apparatus wearable around a waist or chest, when a falling accident occurs, the fall is sensed from an inertial sensor and emergency situation information associated with the falling accident is transmitted. However, there frequently occur a false positive phenomenon that emergency situation information is transmitted by determining that false falling is occurring, and a false negative phenomenon that emergency situation information is not transmitted by determining that actual falling is not falling. Accordingly, unnecessary time and manpower according to false alarm has been used.

In many cases, reliability may not be guaranteed due to traffic burden coming from miniaturization of a wireless apparatus and an increase in the number of nodes of a repeater apparatus. When reliability of data transmission decreases, a falling accident or an emergency situation of an old person may also be overlooked and thus, a serious issue may arise.

SUMMARY OF THE INVENTION

The present invention has been made in an effort to provide a wearable behavioral pattern collecting apparatus for generating collected information by analyzing a behavioral pattern of a wearer, and generating and thereby transmitting emergency call information when an emergency situation occurs, a network including a repeater to transmit information received from the behavioral pattern collecting apparatus to a remote monitoring server, and a behavioral pattern analyzing system and method for transmitting information on an emergency accident and a position of the wearer to a corresponding institution or a corresponding person in charge when an emergency situation such as a falling accident or the emergency accident occurs by observing a change in the behavioral pattern of the wearer.

An exemplary embodiment of the present invention provides a wearable behavioral pattern collecting apparatus, including: an acceleration sensor to generate a three-axial acceleration signal by sensing a motion of a wearer; a behavioral pattern extractor to classify and thereby store behavioral patterns corresponding to patterns of acceleration signals, and to extract a behavioral pattern corresponding to the generated acceleration signal; a wireless communication unit to be connected to a repeater through wireless communication; a position updating unit to update in real time position estimation information including a repeater identification (ID) code of a currently communication connected repeater; and an information collector to periodically generate collected information including an apparatus ID number, the position estimation information, and the extracted behavioral pattern. The wireless communication unit periodically transmits the generated collected information to a monitoring server.

Another exemplary embodiment of the present invention provides a behavioral pattern analyzing system, including: a repeater to transmit a repeater ID code to a behavioral pattern collecting apparatus worn by a wearer, to receive, from the behavioral pattern collecting apparatus, collected information that is periodically transmitted and emergency call information that is transmitted immediately when an emergency situation occurs, and to transmit the received collected information and emergency call information; and a monitoring server to receive the collected information and the emergency call information from the repeater, to store the received collected information and emergency call information in a database, and to immediately transmit the emergency call information to an information terminal held by a person in charge of the behavioral pattern collecting apparatus that has transmitted the emergency call information, when the emergency call information is received. The collected information includes position estimation information including an apparatus ID number of the behavioral pattern collecting apparatus and a repeater ID code of a communication connected repeater, and information on a behavioral pattern that is extracted from an acceleration signal generated based on a motion of a wearer. The emergency call information includes the position estimation information including the apparatus ID number of the behavioral pattern collecting apparatus and the repeater ID code of the communication connected repeater.

Yet another exemplary embodiment of the present invention provides a method of analyzing a behavioral pattern, including: generating a three-axial acceleration signal by sensing a motion of a wearer; extracting a behavioral pattern corresponding to the acceleration signal; updating in real time position estimation information including a repeater ID code of a currently communication connected repeater; periodically generating collected information including an apparatus ID number, the position estimation information, and the extracted behavioral pattern; and periodically transmitting the generated collected information to a monitoring server through wireless communication.

Still another exemplary embodiment of the present invention provides a method of analyzing a behavioral pattern, including: transmitting, by a repeater, a repeater ID code to a behavioral pattern collecting apparatus worn by a wearer; receiving, by the repeater from the behavioral pattern collecting apparatus, collected information that is periodically transmitted and emergency call information that is transmitted immediately when an emergency situation occurs; receiving, by a monitoring server, the collected information and the emergency call information from the repeater, to store the received collected information and the emergency call information in a database; and immediately transmitting, by the monitoring server, the emergency call information to an information terminal held by a person in charge of the behavioral pattern collecting apparatus that has transmitted the emergency call information, when the emergency call information is received. The collected information includes position estimation information including an apparatus ID number of the behavioral pattern collecting apparatus and a repeater ID code of a communication connected repeater, and information on a behavioral pattern that is extracted from an acceleration signal generated based on a motion of a wearer. The emergency call information includes the position estimation information including the apparatus ID number of the behavioral pattern collecting apparatus and the repeater ID code of the communication connected repeater.

Meanwhile, to achieve the aforementioned object, the present invention provides a computer-readable recording medium storing a program to implement the above method.

According to exemplary embodiments of the present invention, it is possible to minimize restraining feeling or inconvenience of a wearer by providing a wearable behavioral pattern collecting apparatus to a body such as a wrist or a waist of a person who needs continuous nursing, and the like. When an emergency situation such as a falling accident and the like occurs, emergency call information may be immediately transmitted, thereby making it possible to cope with the emergency situation, even though the wearer does not actively push an emergency call button.

According to exemplary embodiments of the present invention, emergency related information such as a behavioral pattern of an old person, position information, illumination/temperature, and an emergency situation is transmitted to a corresponding person in charge or institution without being omitted. Accordingly, it is possible to improve reliability, and to overcome constraints of wireless based position estimation by complementarily employing an IR irradiation scheme.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Various modifications and changes may be made to the present invention and thus, exemplary embodiments of the present invention will be described in detail with reference to the accompanying drawings. However, the present invention is not limited thereto or restricted thereby. The exemplary embodiments should be understood to include all the modifications, equivalents, and replacements thereof belonging to the spirit and technical range of the invention.

Hereinafter, exemplary embodiments of the present invention will be described in detail with reference to the accompanying drawings. Like reference numerals refer to like constituent elements through the present specification, even though they are illustrated in different drawings. When it is determined the detailed description related to a related known function or configuration may make the purpose of the present invention unnecessarily ambiguous in describing the present invention, the detailed description will be omitted here.

Figure 1:
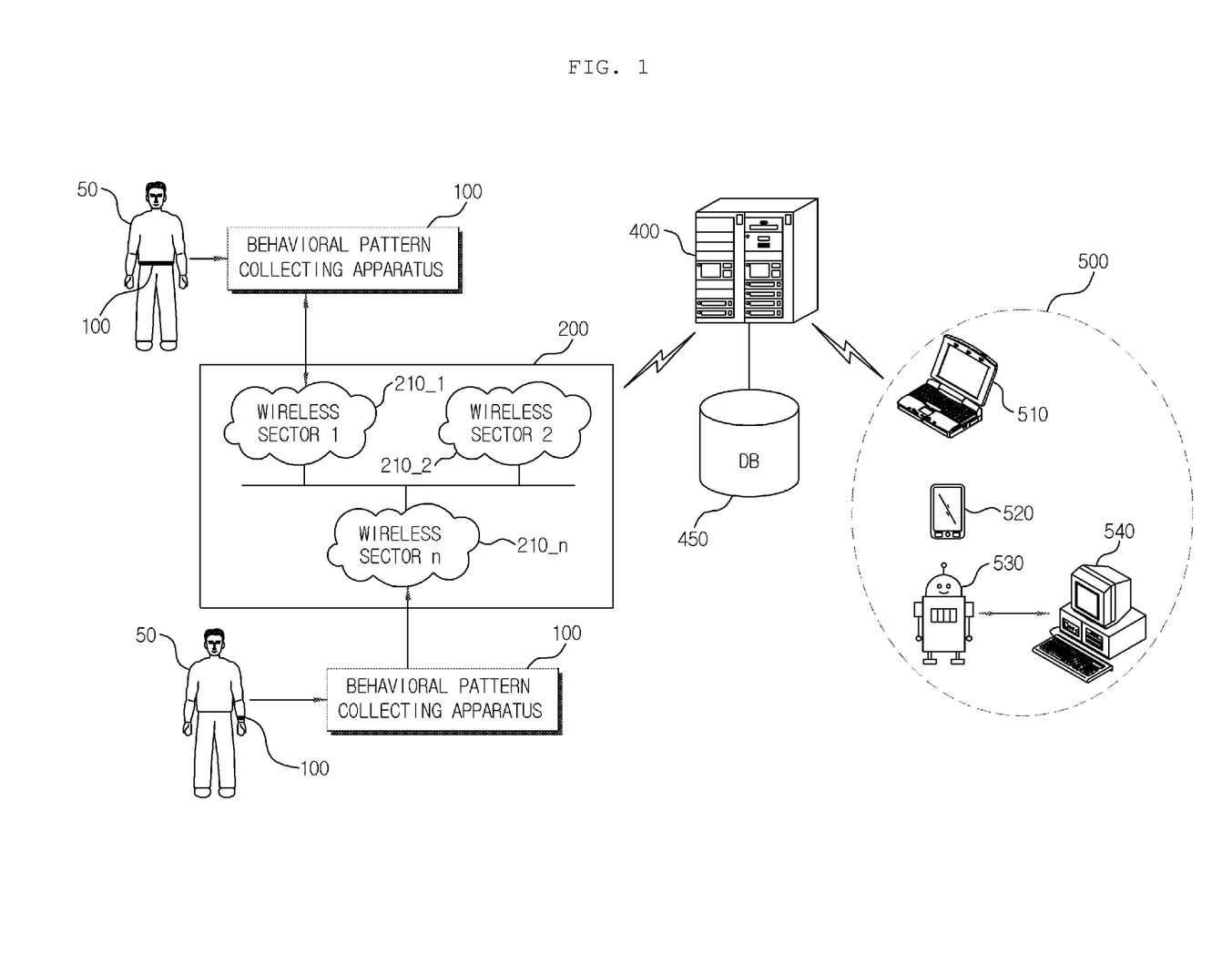
FIG. 1 is an exemplary diagram illustrating a behavioral pattern analyzing system and method according to an exemplary embodiment of the present invention.

FIG. 1 is an exemplary diagram illustrating a behavioral pattern analyzing system and method according to an exemplary embodiment of the present invention.

Referring to FIG. 1, the old person's behavioral pattern analyzing system may include a behavioral pattern collecting apparatus 100, a network 200, and a monitoring server 400, and may further include various information terminals 500 that are connected to the monitoring server 400 over a wired/wireless communication network to receive a variety of information.

The behavioral pattern collecting apparatus 100 is an information collecting apparatus wearable to various portions of a body such as a waist, a wrist, a neck, and the like of an old person, a person being cared, a handicapped person, and the like, who need nursing or protection. The behavioral pattern collecting apparatus 100 includes various sensors, collects information such as a falling accident, a general behavioral pattern, position estimation information, an emergency call of a wearer 50, and the like, and periodically transmits the collected information to the monitoring server 400 over the network 200.

The network 200 includes at least one wireless sector (210_1 to 210_n). A repeater is installed in each of the wireless sectors 210_1 to 210_n, which will be described later. Through wireless communication the behavioral pattern collecting apparatus 100 is connected to the repeater 230 installed within each of the wireless sectors 210_1 to 210_n, and the repeater is connected to the monitoring server 400 over the wired/wireless communication network.

The repeater 230 installed within each of the wireless sectors 210_1 to 210_n has a unique identification (ID) code. Repeater ID information of the repeater 230 connected to the behavioral pattern collecting apparatus 100 through wireless communication is used to determine a position of the wearer 50.

Figure 2:
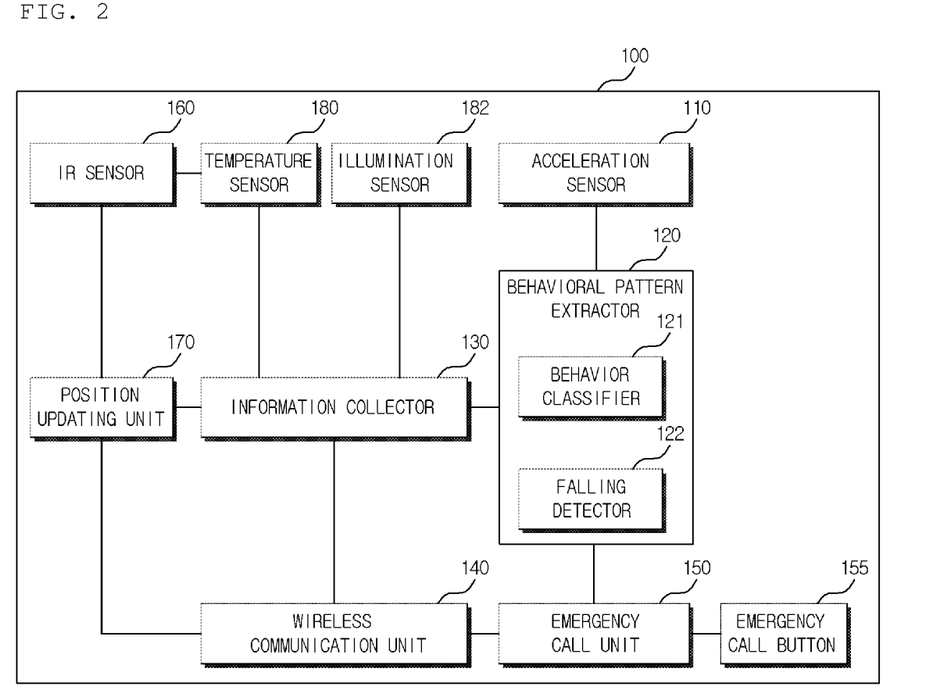
FIG. 2 is a block diagram illustrating a behavioral pattern collecting apparatus according to an exemplary embodiment of the present invention.

When an emergency call button 155 of FIG. 2 is pushed by the wearer 50, or when a falling accident is sensed, the behavioral pattern collecting apparatus 100 immediately transmits emergency call information or information associated with the falling accident to the monitoring server 400 over the network 200.

All the information that the behavioral pattern collecting apparatus 100 collects from the wearer 50 is stored in a database 450 that is connected to the monitoring server 400.

The monitoring server 400 provides information collected from the wearer 50 to a computer/table computer 510 or a personal portal terminal 520 such as a mobile phone of a corresponding person in charge of a hospital or a sanitarium center where an old person or a person being cared belongs, or a robot 530. A person in charge 700 who works in institution such as a therapist, a nurse, a doctor, and the like, may enquire about daily behavioral patterns of the wearers 50, current positions, and the like through the computer/table computer 510 and/or the personal portable terminal 520.

When an institution has a movable telepresence robot 530, persons in charge in the institution may also enquire the movable telepresence robot 530 about relevant information.

When an emergency situation such as an emergency accident, a falling accident, and the like, occurs to the wearer 50, the monitoring server 400 estimates a position of the wearer 50 using access information of the behavioral pattern collecting apparatus 100 in the network 200 or infrared (IR) ID information, which will be described.

The monitoring server 400 controls the movable telepresence robot 530 to autonomously drive to a position indicated by position estimation information of the wearer 50 who has met with the accident. After moving to be close to a position of the corresponding wearer 50, the movable telepresence robot 530 is connected to a telepresence terminal 540 of a person in charge who is positioned in a remote place by performing a telepresence function. The person in charge who is positioned in the remote place may verify a current state of the wearer 50 by exchanging video/audio information with the robot 530, or may have conversation with the wearer 50.

FIG. 2 is a block diagram illustrating the behavioral pattern collecting apparatus 100 according to an exemplary embodiment of the present invention.

Referring to FIG. 2, the behavioral pattern collecting apparatus 100 may include an acceleration sensor 110, a behavioral pattern extractor 120, an information collector 130, a wireless communication unit 140, and a position updating unit 170, and may further include at least one of an emergency call unit 150, the emergency call button 155, an IR sensor 160, a temperature sensor 180, and an illumination sensor 182.

The acceleration sensor 110 functions to generate a three-axial acceleration signal by sensing a motion of the wearer 50. The acceleration sensor 110 collects a motion of the wearer 50 within the acceleration range of about 6 g to about 8 g, and provides the generated acceleration signal to the behavioral pattern extractor 120.

The behavioral pattern extractor 120 classifies and thereby stores behavioral patterns corresponding to acceleration signals, and extracts a behavioral pattern corresponding to the acceleration signal that is received from the acceleration sensor 110.

The behavioral pattern extractor 120 may include a behavior classifier 121 and a falling detector 122.

The behavior classifier 121 extracts, from an acceleration signal, a feature vector that reflects a statistical characteristic, and classifies a behavioral pattern of the wearer 50 corresponding to the acceleration signal from the extracted feature vector.

The behavior classifier 121 collects sample data by classifying in advance various behaviors into, for example, walk, various impacts associated with a hand, a falling accident, a nearly motionless state, other daily behaviors, and the like with respect to many subjects and then classifies four to five types of behavioral patterns at a minimum error rate using a teacher learning scheme of a mechanical learning field.

The behavioral pattern collecting apparatus 100 is generally provided around a wrist and a waist. Here, the wrist has a relatively high degree of freedom and thus, is exposed to frequent impacts. Therefore, even frequent impacts occurring in the wrist may be highly likely to be erroneously determined to be falling and thus, the behavior classifier 121 may learn various behaviors as a pattern and thereby filter frequent impact patterns.

The falling detector 122 detects a case where a behavioral pattern is determined to be a falling accident by monitoring a behavioral pattern classified by the behavior classifier 121.

The position updating unit 170 updates position estimation information of the wearer 50 in real time, and provides the updated position estimation information to the information collector 130. In the present invention, the position estimation information may include a repeater ID code and may further include IR ID information that is included in an IR signal.

Initially, position estimation information of the wearer 50 may be generated based on a repeater ID code of the repeater 230 that is connected to the behavioral pattern collecting apparatus 100. The behavioral pattern collecting apparatus 100 is connected to any one of a plurality of repeaters installed in the wireless sectors (210_1 to 210_n) through wireless communication and generally connected to a repeater having the strongest signal output. In generally, output of a signal coming from a repeater that is positioned to be closest is strongest. Therefore, when a repeater connected to the behavioral pattern collecting apparatus 100 is identified, a position of the wearer 50 may be estimated.

Once power is supplied, the behavioral pattern collecting apparatus 100 may immediately attempt to access the adjacent repeater 230 that currently provides the most excellent transceivable wireless signal. When the connection succeeds, it is possible to estimate that the wearer 50 is positioned to be adjacent to the repeater 230 unless the wearer 50 is beyond the corresponding repeater 230.

Meanwhile, when the number of repeaters 230 increases, the behavioral pattern collecting apparatus 100 may be likely to be connected to a remote repeater through wireless communication, instead of being connected to an adjacent repeater. Due to a complex structure inside a building, weather change, and the like, the behavioral pattern collecting apparatus 100 may be connected to another repeater that is positioned further away, instead of being connected to the adjacent repeater. Accordingly, to more accurately estimate a position of the wearer 50, the position updating unit 170 may generate position estimation information based on IR ID information that is included in an IR signal received from the IR sensor 160, which will be described later.

The repeater 230 periodically transmits an IR signal including unique IR ID information to a neighbor at the strongest output. When the wearer 50 passes by or stays around the repeater 230, the IR sensor 160 of the behavioral pattern collecting apparatus 100 receives the IR signal, and the position updating unit 170 generates position estimation information on the wearer 50 based on IR ID information. Except for a case where the behavioral pattern collecting apparatus 100 is hidden by or covered with clothes and the like, the IR ID information has top priority with respect to position estimation information. When IR ID information is not obtained, a repeater ID code of the repeater 230 currently connected through wireless communication becomes basic information of the position estimation information.

The emergency call button 155 is a button that the wearer 50 or an adjacent person can directly push when an emergency situation occurs.

Either when the extracted behavioral pattern is a falling accident, or when the emergency call button 155 is pushed, the emergency call unit 150 generates emergency call information including an apparatus ID number of the behavioral pattern collecting apparatus 100 and position estimation information, and immediately transmits the generated emergency call information to the monitoring server 400.

The wireless communication unit 140 is connected to the repeater 230 through wireless communication, and periodically transmits the collected information to the repeater 230, and transmits emergency call information to the repeater 230 immediately when the emergency call information is generated.

The behavioral pattern collecting apparatus 100 and the repeater 230 are connected to each other through wireless communication. One of a current near field wireless communication scheme including zigbee, radio frequency (RF) communication, Bluetooth, wireless local area network (WLAN), and wireless fidelity (Wi-Fi), and/or any types of near field wireless communication schemes to be later applied may be employed.

Meanwhile, the temperature sensor 180 measures body temperature of the wearer 50 or peripheral temperature, and the illumination sensor 182 measures peripheral illumination of the wearer 50. The measured temperature and illumination may be provided to the information collector 130 and thereby be included in collected information, and may be used to verify a peripheral environmental situation of the wearer 50.

The information collector 130 periodically generates collected information and transmits the generated collected information to the repeater 230 through the wireless communication unit 140. The collected information may include an apparatus ID number of the behavioral pattern collecting apparatus 100, position estimation information, and information on a behavioral pattern, and may further include temperature information measured by the temperature sensor 180 and illumination information measured by the illumination sensor 182.

As described above, position estimation information may primarily include a repeater ID code, and may also include IR ID information when an IR signal including the IR ID information is received by the IR sensor 160. When the IR ID information is obtained, the IR ID information may be referred to over the repeater ID code to estimate a position of the wearer 50.

Figure 3:
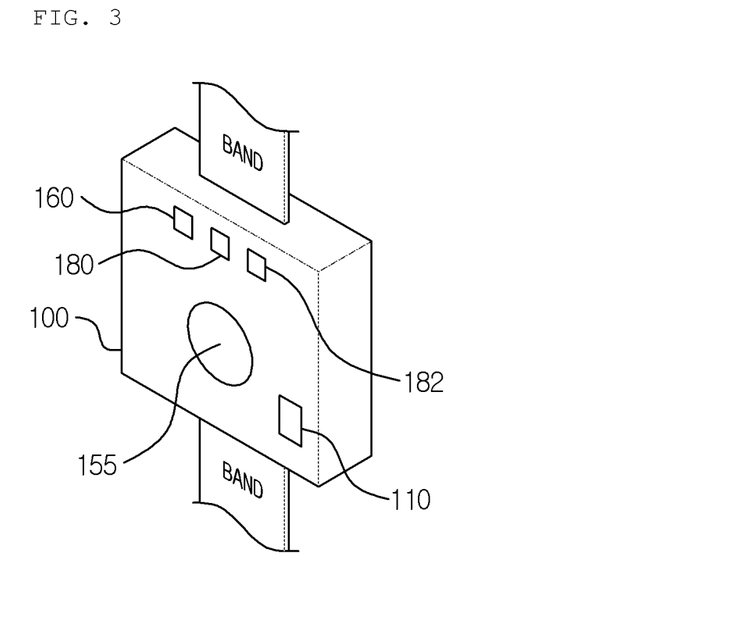
FIG. 3 is a perspective view illustrating a configured behavioral pattern collecting apparatus according to an exemplary embodiment of the present invention.

FIG. 3 is a perspective view illustrating a configured behavioral pattern collecting apparatus according to an exemplary embodiment of the present invention.

The behavioral pattern collecting apparatus 100 according to an exemplary embodiment of the present invention may include a band wearable to a wrist, a waist, and the like. The emergency call button 155 capable of pushing in the case of an emergency situation is provided on a front face of the behavioral pattern collecting apparatus 100.

Various types of sensors, for example, the IR sensor 160, the temperature sensor 180, and the illumination sensor 182 are mounted on the front face of the behavioral pattern collecting apparatus 100, and the acceleration sensor 110 is mounted therein.

Figure 4:
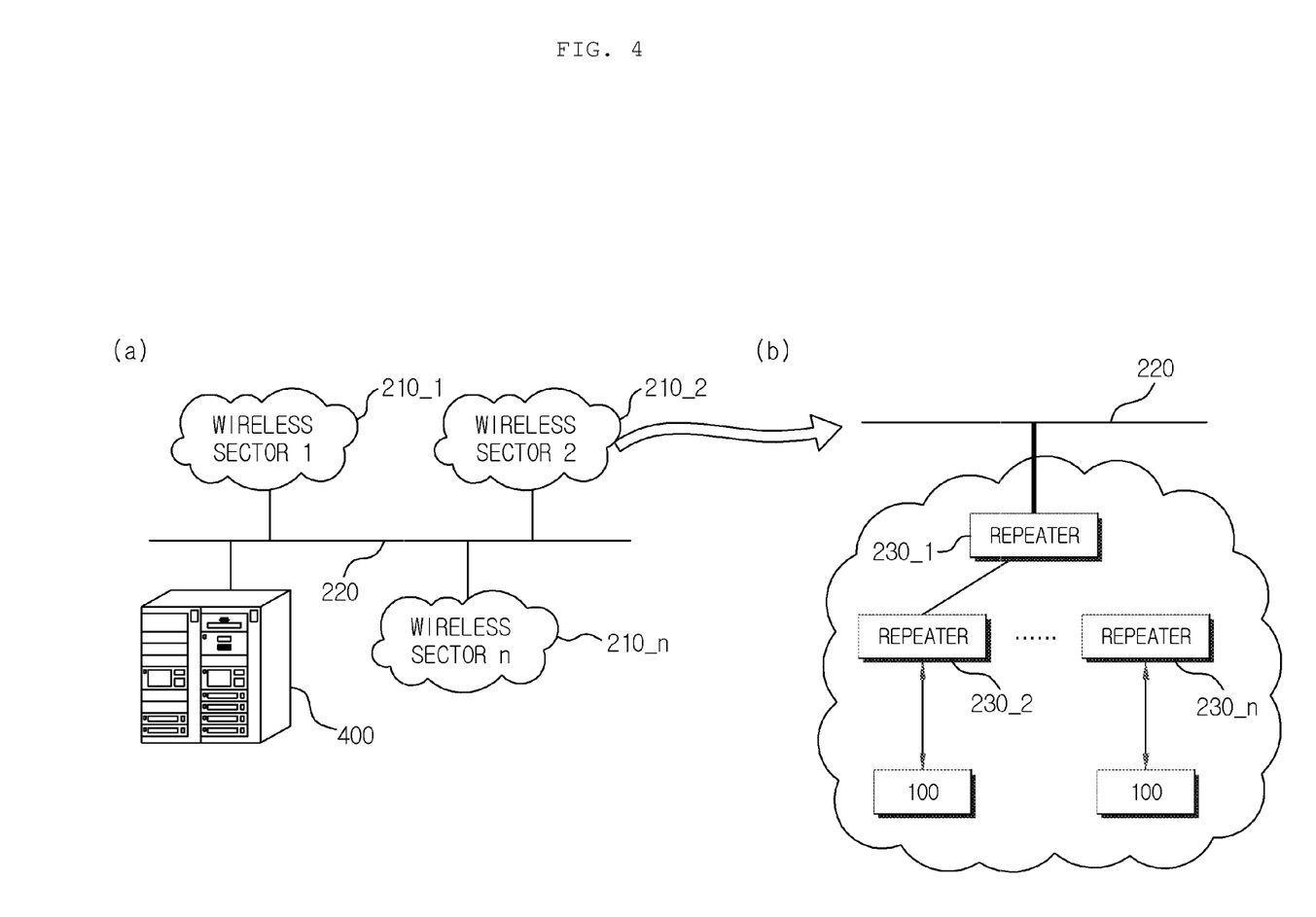
FIG. 4 is a diagram illustrating a configuration of a network including a wireless sector according to an exemplary embodiment of the present invention.

FIG. 4 is a diagram illustrating a configuration of a network including a wireless sector according to an exemplary embodiment of the present invention.

Among repeaters 230_1 to 230_n within the respective wireless sectors 210_1 to 210_n, any one repeater 230_1 is configured to be connected to a wired LAN such as Ethernet 220 and the like, and to be capable of transmitting information to the monitoring server 400. A shadowing area may be removed, and the number and positions of repeaters 230_1 to 230_n may be appropriately adjusted based on places where the repeaters 230_1 to 230_n are installed, and a redundancy level of a supported Ethernet port. The number of repeaters 230_1 to 230_n increases according to an increase in the number of wireless selectors 210_1 to 210_n.

When the wearer 50 moves to an intermediate zone between wireless selectors or between repeaters that are separated from each other at a predetermined distance, the behavioral pattern collecting apparatus 100 terminates wireless communication connection with an existing connected repeater and swiftly hands over to an adjacent repeater. When a targeted service providing area becomes wide, load of an end repeater in which data is collected increases and thus, traffic of the network 200 may not be efficiently managed. However, in the present invention, by supporting integral connection with the Ethernet 220 and by configuring the network 200 based on a plurality of wireless sectors, traffic burden is appropriately equivalently distributed and thus, reliability about the network 200 may be improved.

Figure 5:
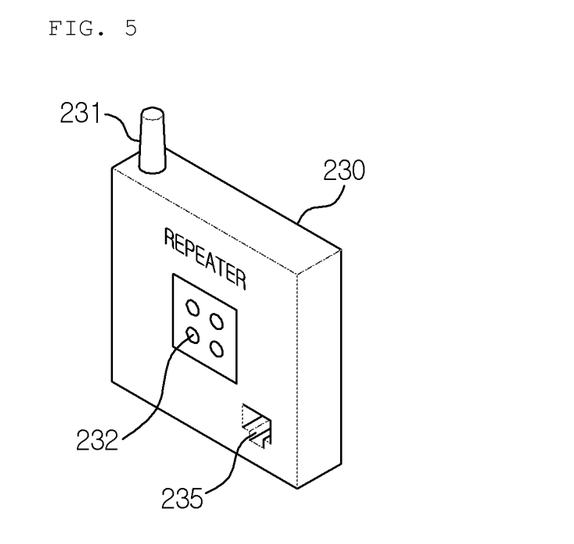
FIG. 5 is a perspective view illustrating a repeater according to an exemplary embodiment of the present invention.

FIG. 5 is a perspective view illustrating a repeater according to an exemplary embodiment of the present invention.

Referring to FIG. 5, the repeater 230 according to an exemplary embodiment of the present invention may include an antenna 231 to transmit and receive a wireless signal through wireless communication, and may further include an IR light emitting diode (LED) 232 to periodically irradiate, to an outside, an IR signal including IR ID information.

The repeater 230 is connected to a plurality of other repeaters through wireless communication to thereby expand the network 200, and periodically irradiates an IR signal having unique IR ID information at a position where the repeater 230 is installed.

The repeater 230 may be embedded with an Ethernet port 235 to configure an integral network with the Ethernet 220.

The repeater 230 is connected to the behavioral pattern collecting apparatus 100 of the wearer 50 through wireless communication to transmit, to the behavioral pattern collecting apparatus 100, a repeater ID code that is a basis of position estimation information, to irradiate, to the IR LED 232, an IR ray including the IR ID information, to receive collected information and/or emergency call information from each behavioral pattern collecting apparatus 100, and to transmit the received collected information and emergency call information to the monitoring server 400.

Figure 6:
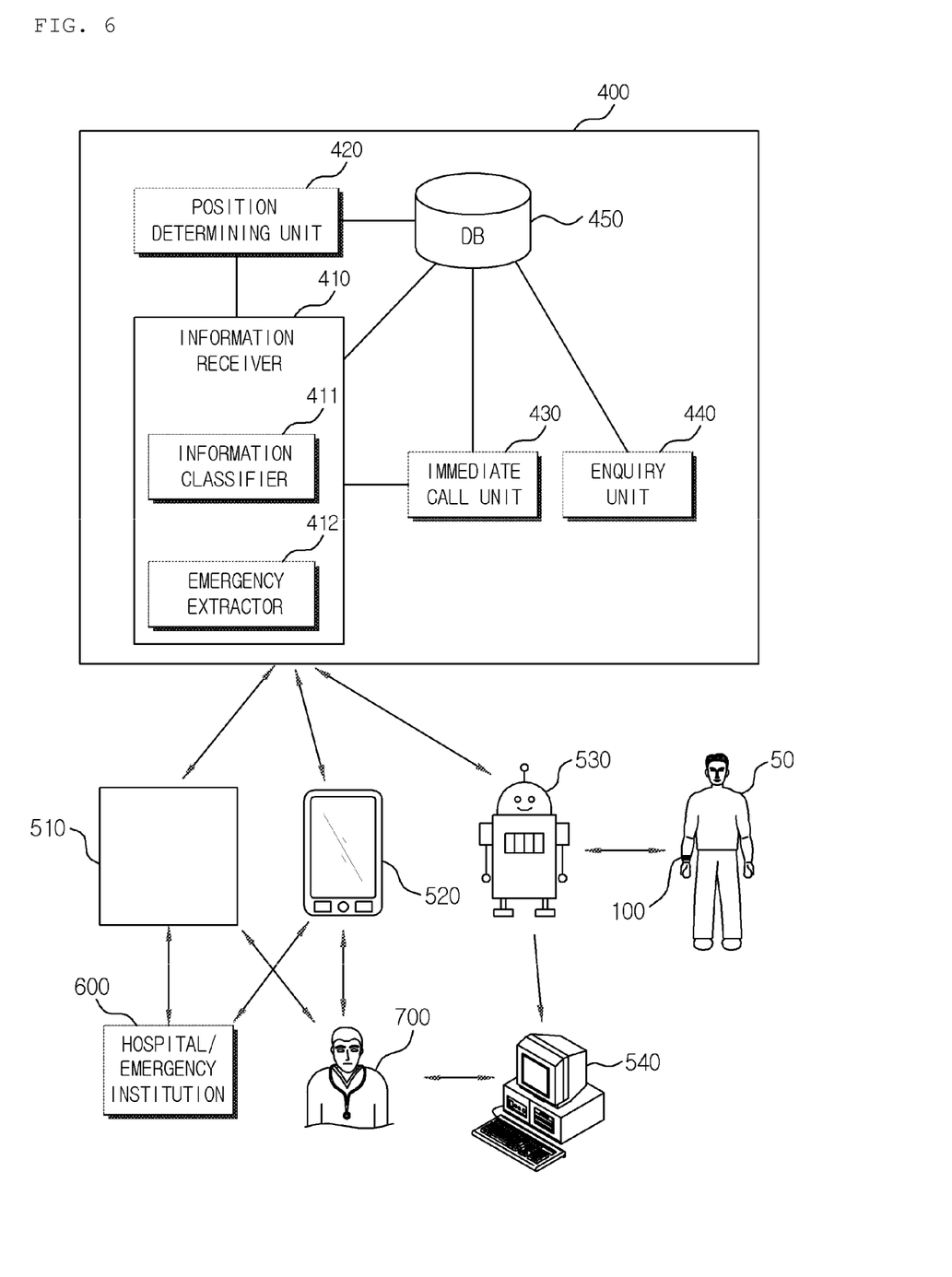
FIG. 6 is a diagram illustrating a monitoring server and an information terminal according to an exemplary embodiment of the present invention.

FIG. 6 is a diagram illustrating a monitoring server and an information terminal according to an exemplary embodiment of the present invention.

Referring to FIG. 6, the monitoring server 400 according to an embodiment of the present invention may include an information receiver 410, a position determining unit 420, an immediate call unit 430, and a database 450, and may further include an enquiry unit 440.

The information receiver 410 receives collected information and emergency call information that is transmitted from the repeater 230 to each behavioral pattern collecting apparatus 100, and stores the received collected information and emergency call information in the database 450.

The information receiver 410 includes an information classifier 411 and an emergency extractor 412.

The information classifier 411 classifies, for each behavioral pattern collecting apparatus 100, collected information and emergency call information of each behavioral pattern collecting apparatus 100 that is received from the repeater 230, and thereby stores the classified collected information and emergency call information in the database 450.

The emergency extractor 412 monitors whether emergency call information is received from the repeater 230, and provides the emergency call information to the immediate call unit 430 when the emergency call information is received.

The position determining unit 420 determines a position of the wearer 50 based on position estimation information that is included in collected information or emergency call information, and updates the determined position in the database 450. Since the database 450 stores a repeater installation position, a repeater ID code, and IR ID information for each repeater 230, the position determining unit 420 may determine a current position of the wearer 50 using the repeater ID code or IR ID information that is included in the position estimation information. Meanwhile, as described above, when the IR ID information is included in the position estimation information, the position determining unit 420 determines a position of the wearer 50 using the IR ID information over the repeater ID code.

Meanwhile, with respect to each wearer 50 wearing the behavioral pattern collecting apparatus 100, the database 450 stores information on an apparatus ID number of the wearing behavioral pattern collecting apparatus 100, a contact number of a hospital or an emergency institution 600, a person in charge 700, and an information terminal 500 held by the person in charge.

When emergency call information is received, the immediate call unit 430 identifies the wearer 50 of the behavioral pattern collecting apparatus 100 in which the emergency call information is generated, based on an apparatus ID number included in the emergency call information, and immediately transmits the emergency call information to the information terminal 500 that is held by a person in charge of the corresponding identified wearer 50.

As described above, the information terminal 500 may be the computer or the tablet computer 510, the personal portable terminal 520 such as a mobile phone, the movable telepresence robot 530, and the like.

Hereinafter, a behavioral pattern analyzing method will be described. The behavioral pattern analyzing method according to the present invention is essentially identical to a behavioral pattern analyzing system according to the present invention and thus, a detailed description and a repeating description will be omitted.

Figure 7:
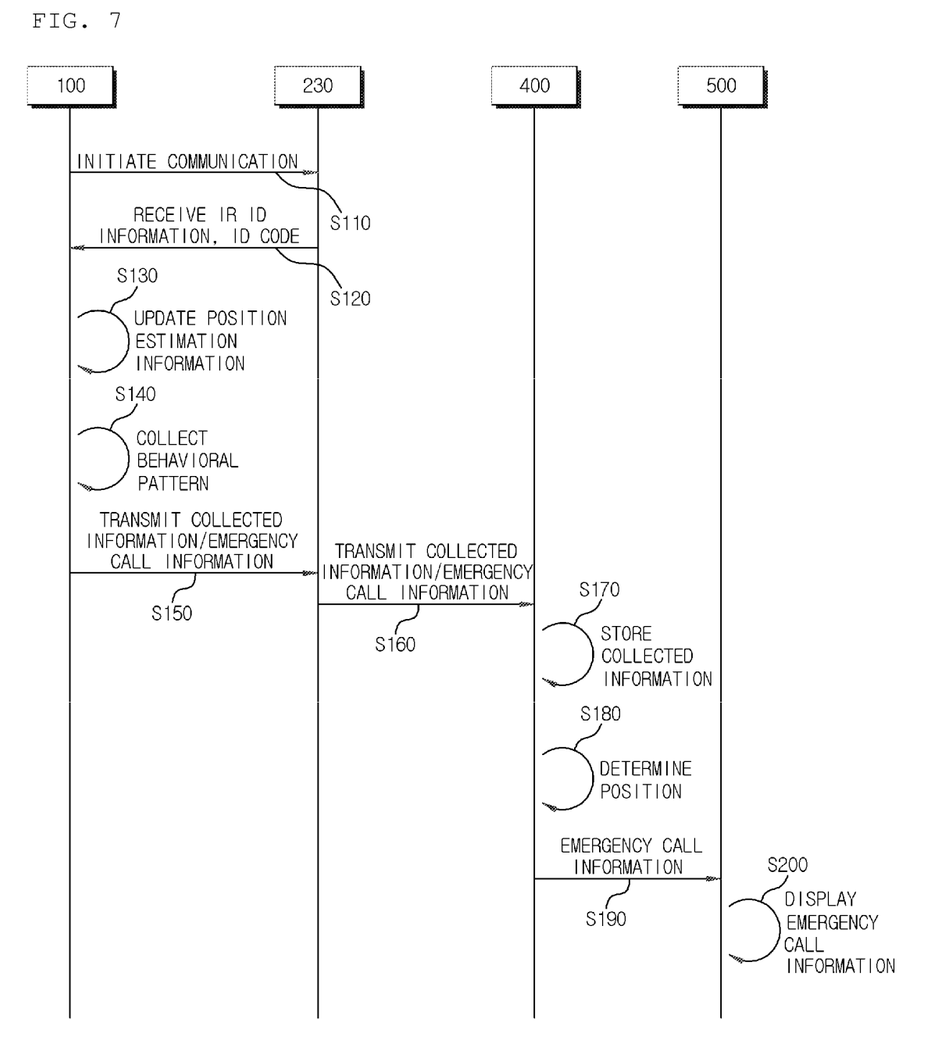
FIG. 7 is a flowchart schematically illustrating a behavioral pattern analyzing method according to an exemplary embodiment of the present invention.

FIG. 7 is a flowchart schematically illustrating a behavioral pattern analyzing method according to an exemplary embodiment of the present invention, and describes information exchanged among the behavioral pattern collecting apparatus 100, the repeater 230, the monitoring server 400, and the information terminal 500.

Initially, when power is supplied, the behavioral pattern collecting apparatus 100 initiates wireless communication with the adjacent repeater 230 (S110).

The behavioral pattern collecting apparatus 100 receives a repeater ID code and IR ID information from the repeater 230 (S120), and updates position estimation information in real time based on the received repeater ID code and IR ID information (S130).

At the same time, the behavioral pattern collecting apparatus 100 periodically collects a behavioral pattern by extracting a behavioral pattern corresponding to an acceleration signal (S140).

Next, the behavioral pattern collecting apparatus 100 periodically generates collected information including an apparatus ID number of the behavioral pattern collecting apparatus 100, position estimation information, and the extracted behavioral pattern, and transmits the generated collected information to the repeater 230 (S150). Either when the extracted behavioral pattern is a falling accident, or when the emergency call button 155 is pushed, the behavioral pattern collecting apparatus 100 generates emergency call information including the apparatus ID number and the position estimation information, and immediately transmits the generated emergency call information to the repeater 230 (S150).

The repeater 230 receives the collected information and the emergency call information from the behavioral pattern collecting apparatus 100, and transmits the received collected information and emergency call information to the monitoring server 400 (S160).

The monitoring server 400 stores the received collected information in the database 450 (S170), and determines a position of the wearer 50 based on the position estimation information included in the collected information (S180). Even when the emergency call information is received, the monitoring server 400 stores the emergency call information in the database 450 and determines a position of the wearer 50 based on position estimation information included in the emergency call information.

Meanwhile, when the emergency call information is received, the monitoring server 400 search for a corresponding person in charge based on the apparatus ID number included in the emergency call information and transmits the emergency call information to the information terminal 500 of the corresponding person in charge (S190).

The information terminal 500 of the corresponding person in charge may receive the emergency call information and may display the received emergency call information on a screen, so that the person in charge may take a necessary action (S200). The person in charge may estimate a position of the wearer 50 who has met with an emergency accident based on position estimation information included in the emergency call information, and may take an action such as dispatching a person to the estimated position, moving the movable telepresence robot 530 to the estimated position, and the like.

Figure 8:
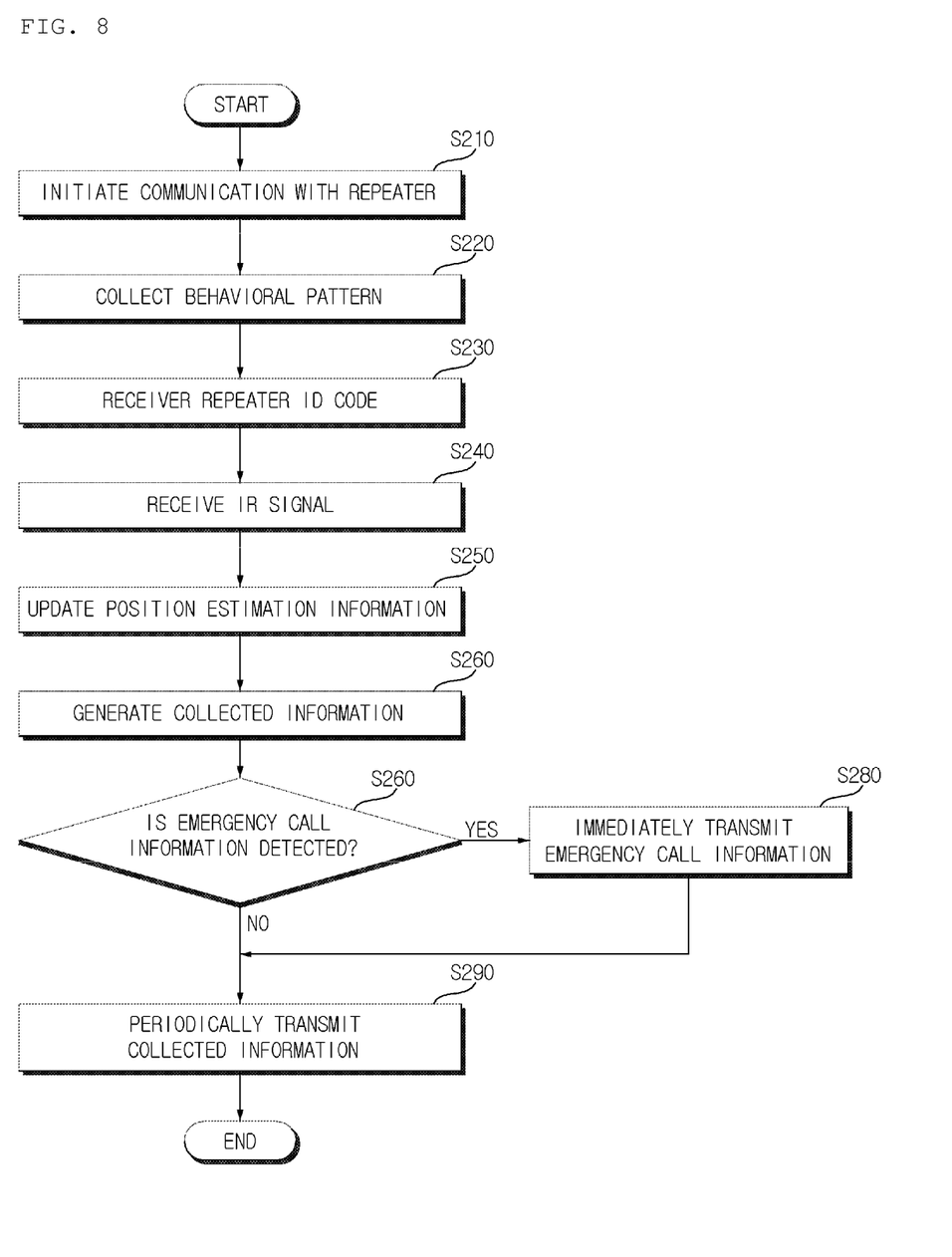
FIG. 8 is a flowchart illustrating a behavioral pattern analyzing method that is performed by a behavioral pattern collecting apparatus according to an exemplary embodiment of the present invention.

FIG. 8 is a flowchart illustrating a behavioral pattern analyzing method that is performed by a behavioral pattern collecting apparatus 100 according to an exemplary embodiment of the present invention.

Initially, the behavioral pattern collecting apparatus 100 initiates communication with the repeater 230 (S210).

Next, the behavioral pattern collecting apparatus 100 receives an acceleration signal from the acceleration sensor 110, and extracts a behavioral pattern corresponding to the received acceleration signal (S220).

The behavioral pattern collecting apparatus 100 receives a repeater ID code from a communication connected repeater 230 (S230), and receives an IR signal that is irradiated from the repeater 230 and that includes IR ID information (S240).

The behavioral pattern collecting apparatus 100 generates position estimation information and updates the position estimation information in real time (S250). As described above, the position estimation information may include a repeater ID code and in this instance, may further include IR ID information when the IR signal is received. When estimating a position of the wearer 50, the IR ID information is considered over the repeater ID code.

The behavioral pattern collecting apparatus 100 periodically generates collected information including an apparatus ID number of the behavioral pattern collecting apparatus 100, position estimation information, and the extracted behavioral pattern (S260).

The behavioral pattern collecting apparatus 100 monitors whether the extracted behavioral pattern is a falling accident and whether the emergency call button 155 is pushed, and generates emergency call information including the apparatus ID number and position estimation information when any one of the above two cases occurs (S270).

When the emergency call information is generated, the behavioral pattern collecting apparatus 100 immediately transmits the emergency call information to the repeater 230 (S280). When the emergency call information is not generated, the behavioral pattern collecting apparatus 100 periodically transmits collected information to the repeater 230 (S290).

Figure 9:
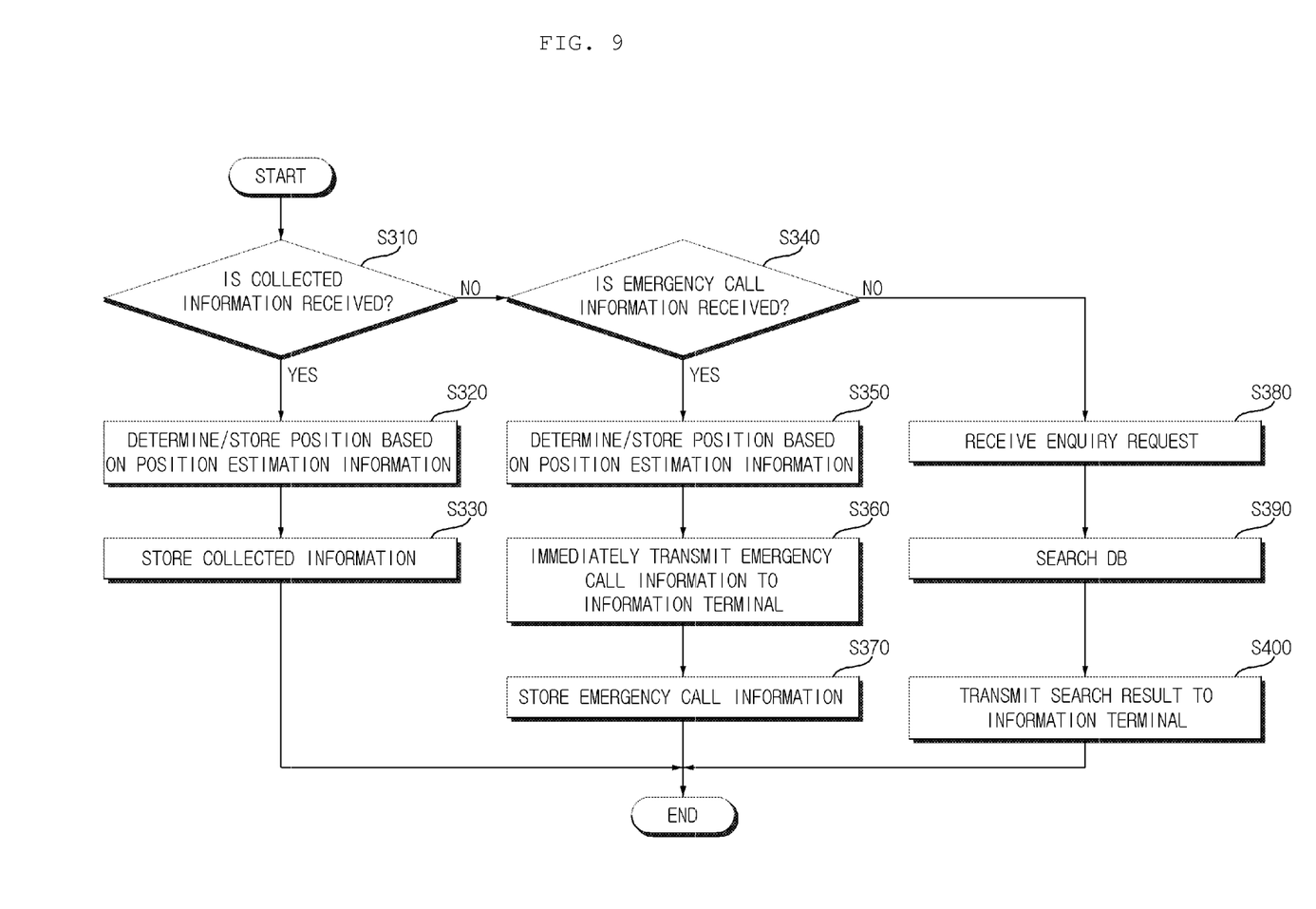
FIG. 9 is a flowchart illustrating a behavioral pattern analyzing method that is performed by a monitoring server according to an exemplary embodiment of the present invention.

FIG. 9 is a flowchart illustrating a behavioral pattern analyzing method that is performed by the monitoring server 400 according to an exemplary embodiment of the present invention.

The monitoring server 400 determines whether collected information is received (S310).

When the collected information is received, the monitoring server 400 determines a position of the wearer 50 based on position estimation information included in the collected information and stores the determined position of the wearer 50 in the database 450 (S320).

The monitoring server 400 stores the collected information in the database 450 (S330).

Meanwhile, when emergency call information instead of receiving collected information is received (S340), the monitoring server 400 determines a position of the wearer 50 based on position estimation information included in the emergency call information and stores the determined position of the wearer 50 in the database 450 (S350).

The monitoring server 400 searches for and extracts a corresponding person in charge based on the apparatus ID number included in the emergency call information and immediately transmits the emergency call information to the information terminal 500 held by the extracted person in charge (S360).

The monitoring server 400 stores the emergency call information in the database 450 (S370).

Meanwhile, the monitoring server 400 may receive an enquiry request about various types of information from the information terminal 500 (S380). For example, the enquiry request may be a request for inquiring about a behavioral pattern of the wearer 50 or information on each person in charge.

The monitoring server 400 searches the database 450 for information corresponding to the enquiry request (S390), and transmits the search result to the information terminal 500 that has transmitted the enquiry request (S400).

Figure 10:
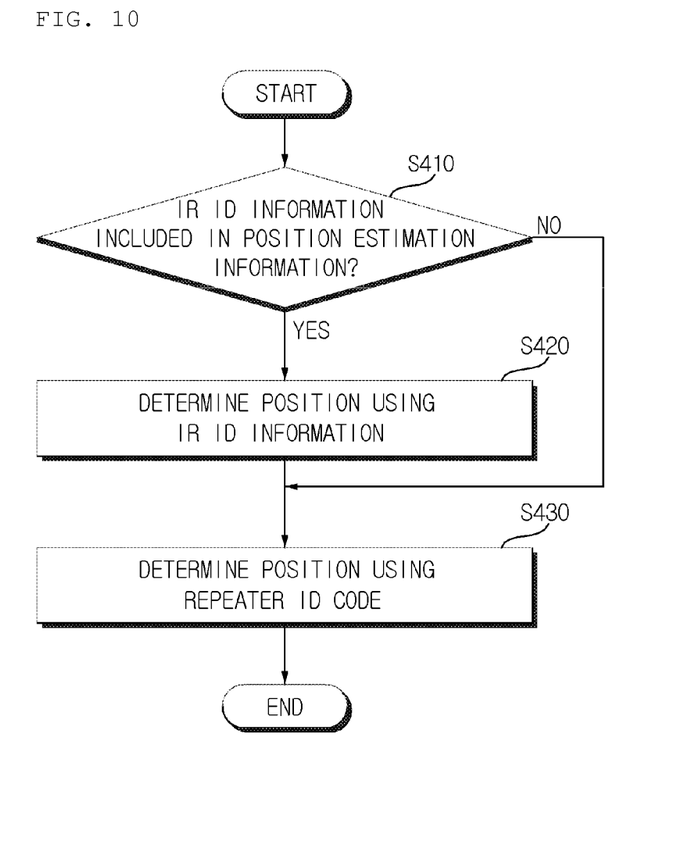
FIG. 10 is a flowchart illustrating an operation of determining, by a monitoring server, a position of a wearer according to an exemplary embodiment of the present invention.

FIG. 10 is a flowchart illustrating an operation of determining, by a monitoring server, a position of a wearer according to an exemplary embodiment of the present invention.

Initially, the monitoring server 400 verifies whether IR ID information is included in collected information or position estimation information included in emergency call information (S410). As described above, the IR ID information is used over a repeater ID code to estimate a position.

When the IR ID information is included in the position estimation information, the monitoring server 400 determines a position of the wearer 50 using the IR ID information (S420).

Meanwhile, when the IR ID information is not included in the position estimation information, the monitoring server 400 determines the position of the wearer 50 using the repeater ID code (S430).

The method of the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A wearable behavioral pattern collecting apparatus, comprising:
   an acceleration sensor to generate a three-axial acceleration signal by sensing a motion of a wearer;
   a behavioral pattern extractor to classify and thereby store behavioral patterns of the wearer corresponding to patterns of acceleration signals, and to extract a behavioral pattern of the wearer corresponding to the generated acceleration signal;
   a wireless communication unit to be connected to a repeater through wireless communication;
   a position updating unit to update in real time position estimation information including a repeater identification (ID) code of a currently communication connected repeater;
   an information collector to periodically generate collected information including an apparatus ID number, the position estimation information, and the extracted behavioral pattern, wherein the wireless communication unit periodically transmits the generated collected information to a monitoring server;
   an emergency call button to push when an emergency situation occurs; and
   an emergency call unit to generate emergency call information including the apparatus ID number and the position estimation information in a case where the extracted behavioral pattern is a falling accident, and to immediately transmit the generated emergency call information to the monitoring server.

2. The apparatus of claim 1, further comprising:
   an infrared (IR) sensor to receive, from the repeater, an IR signal including IR ID information, wherein the position estimation information further includes the IR ID information included in the received IR signal.

3. The apparatus of claim 1, further comprising:
   an illumination sensor to sense peripheral illumination; and
   a temperature sensor to sense temperature.

4. A behavioral pattern analyzing system, comprising:
   a repeater to transmit a repeater ID code to a behavioral pattern collecting apparatus worn by a wearer, to receive, from the behavioral pattern collecting apparatus, collected information that is periodically transmitted and emergency call information that is transmitted immediately when an emergency situation occurs, and to transmit the received collected information and emergency call information; and
   a monitoring server to receive the collected information and the emergency call information from the repeater, to store the received collected information and emergency call information in a database, and to immediately transmit the emergency call information to an information terminal held by a person in charge of the behavioral pattern collecting apparatus that has transmitted the emergency call information, when the emergency call information is received,
   wherein the collected information includes position estimation information including an apparatus ID number of the behavioral pattern collecting apparatus and a repeater ID code of a communication connected repeater, and information on a behavioral pattern that is extracted from an acceleration signal generated based on a motion of a wearer, and
   the emergency call information includes the position estimation information including the apparatus ID number of the behavioral pattern collecting apparatus and the repeater ID code of the communication connected repeater.

5. The system of claim 4, wherein the monitoring server determines a position of the wearer based on the repeater ID information.

6. The system of claim 5, wherein:
   the repeater transmits, to the behavioral pattern collecting apparatus, an IR signal including IR ID information,
   when the IR signal is received, the behavioral pattern collecting apparatus generates position estimation information including the IR ID information, and
   the monitoring server determines the position of the wearer based on the IR ID information.

7. The system of claim 6, wherein the behavioral pattern analyzing system controls a telepresence robot to autonomously drive to a position of the behavioral pattern collecting apparatus that has transmitted the emergency call information.

8. The system of claim 4, wherein when an enquiry request for inquiring about information on a behavioral pattern of the wearer is received from the information terminal, the monitoring server transmits, to the information terminal, a result that is obtained by searching the database for information on the behavioral pattern of the wearer.

9. A method of analyzing a behavioral pattern, comprising:
   generating a three-axial acceleration signal by sensing a motion of a wearer;
   extracting a behavioral pattern of the wearer corresponding to the acceleration signal;
   updating in real time position estimation information including a repeater ID code of a currently communication connected repeater;
   periodically generating collected information including an apparatus ID number, the position estimation information, and the extracted behavioral pattern;
   periodically transmitting the generated collected information to a monitoring server through wireless communication;
   immediately generating emergency call information including the apparatus ID number and the position estimation information when the extracted behavioral pattern is a falling accident; and
   immediately transmitting the generated emergency call information to the monitoring server.

10. The method of claim 9, further comprising:
    receiving, from a repeater, an IR signal including IR ID information,
    wherein the position estimation information further includes the IR ID information included in the received IR signal.

11. The method of claim 9, further comprising:
    measuring peripheral illumination; and
    measuring peripheral temperature, wherein the collected information further includes information on the measured illumination and temperature.

12. A method of analyzing a behavioral pattern, comprising:
transmitting, by a repeater, a repeater ID code to a behavioral pattern collecting apparatus worn by a wearer;
receiving, by the repeater from the behavioral pattern collecting apparatus, collected information that is periodically transmitted and emergency call information that is transmitted immediately when an emergency situation occurs;
receiving, by a monitoring server, the collected information and the emergency call information from the repeater, to store the received collected information and the emergency call information in a database; and
immediately transmitting, by the monitoring server, the emergency call information to an information terminal held by a person in charge of the behavioral pattern collecting apparatus that has transmitted the emergency call information, when the emergency call information is received,
wherein the collected information includes position estimation information including an apparatus ID number of the behavioral pattern collecting apparatus and a repeater ID code of a communication connected repeater, and information on a behavioral pattern that is extracted from an acceleration signal generated based on a motion of a wearer, and
the emergency call information includes the position estimation information including the apparatus ID number of the behavioral pattern collecting apparatus and the repeater ID code of the communication connected repeater.

13. The method of claim 12, further comprising:
determining, by the monitoring server, a position of the wearer based on the repeater ID information.

14. The method of claim 13, further comprising:
transmitting, by the repeater to the behavioral pattern collecting apparatus, an IR signal including IR ID information;
generating, by the behavioral pattern collecting apparatus, position estimation information including the IR ID information when the IR signal is received; and
determining, by the monitoring server, the position of the wearer based on the IR ID information.

15. The method of claim 14, further comprising:
controlling a telepresence robot to autonomously drive to a position of the behavioral pattern collecting apparatus that has transmitted the emergency call information.

16. The method of claim 12, further comprising:
receiving, by the monitoring server from the information terminal, an enquiry request for inquiring about information on a behavioral pattern of the wearer; and
transmitting, by the monitoring server to the information terminal, a result that is obtained by searching the database for information on the behavioral pattern of the wearer, when the enquiry request is received.

* * * * *